United States Patent [19]

Kugell et al.

[11] Patent Number: 5,802,160
[45] Date of Patent: Sep. 1, 1998

[54] MULTI-RING TELEPHONE METHOD AND SYSTEM

[75] Inventors: Stanley Kugell, Newton Highlands; David Silver, Cambridge, both of Mass.

[73] Assignee: Pilgrim Telephone, Inc., Cambridge, Mass.

[21] Appl. No.: 590,110

[22] Filed: Jan. 19, 1996

[51] Int. Cl.[6] .............................. H04M 3/46; H04M 3/56
[52] U.S. Cl. .................... 379/211; 379/188; 379/205; 370/261; 370/270
[58] Field of Search .......................... 379/201, 202, 379/203, 204, 205, 206, 211, 212, 93, 95, 188, 199, 37, 354, 355, 356; 370/259, 260, 261, 262, 270, 280; 395/2.4; 340/825.44, 825.45, 825.47

[56] References Cited

U.S. PATENT DOCUMENTS

| | | | |
|---|---|---|---|
| 4,803,717 | 2/1989 | Marui | 379/67 |
| 5,043,718 | 8/1991 | Shimura | 340/825.44 |
| 5,103,448 | 4/1992 | Barnes et al. | 370/280 |
| 5,166,972 | 11/1992 | Smith | 379/37 |
| 5,206,901 | 4/1993 | Harlow et al. | 379/201 |
| 5,259,026 | 11/1993 | Johnson | 379/207 |
| 5,329,578 | 7/1994 | Brennan et al. | 379/201 |
| 5,430,791 | 7/1995 | Feit et al. | 379/211 |
| 5,454,032 | 9/1995 | Pinard et al. | 379/167 |
| 5,483,586 | 1/1996 | Sussman | 379/201 |
| 5,483,587 | 1/1996 | Hogan et al. | 379/202 |
| 5,502,762 | 3/1996 | Andrew et al. | 379/202 |
| 5,521,716 | 5/1996 | Itoh | 358/402 |
| 5,546,449 | 8/1996 | Hogan et al. | 379/202 |
| 5,559,876 | 9/1996 | Alperovich | 379/205 |
| 5,568,546 | 10/1996 | Marutiak | 379/355 |
| 5,590,189 | 12/1996 | Turnbull et al. | 379/356 |
| 5,631,904 | 5/1997 | Fitser et al. | 379/205 |

OTHER PUBLICATIONS

"Mechanism to Automate Updating Obsolete Telephone Numbers," pp. 115–116, vol. 37, No. 04A, IBM Technical Disclosure Bulletin, Apr. 1994.

*Primary Examiner*—Krista Zele
*Assistant Examiner*—Scott Wolinsky
*Attorney, Agent, or Firm*—Strung Kramer Schaefer & Briscoe

[57] ABSTRACT

A method and system of providing telephone service comprises associating a list of telephone numbers with a representative telephone number. A call to the representative telephone number is detected and a plurality of telephone numbers on the list are simultaneously signalled. Thereafter, signalling is terminated at at least one of the plurality of telephone numbers thereby allowing a connection to be established with one or more parties at telephone numbers among the plurality of telephone numbers. Each telephone number on the list may be a representative number which is associated with another list of telephone numbers.

47 Claims, 9 Drawing Sheets

| REPRESENTATIVE NUMBER: 800-555-1234 | | SIGNALLING TERMINATION REQUIREMENTS: 1 OFF-HOOK; 25 RINGS | | | |
|---|---|---|---|---|---|
| LIST OF ASSOCIATED NUMBERS | TIME PARAMETERS | ANI PARAMETERS | SIGNALLING DELAY PARAMETERS | VERIFICATION PARAMETERS | DELETION PARAMETERS |
| HOME TEL. NUMBER 20 | 6PM-12AM ONLY | TABLE A (EXCLUDED NOS.) | 5 RINGS ONLY | PIN NO. A | NONE |
| VACATION HOME TEL. NUMBER 21 | 9AM-5PM, M-F ONLY | TABLE A (EXCLUDED NOS.) | 5 RINGS ONLY | PIN NO. B | 9/30/95 |
| IN-LAWS' HOME TEL. NUMBER 22 | 6 PM-10 PM, AUGUST ONLY | TABLE B (EXCLUDED NOS.) | START AFTER 6 RINGS | VOICE CODE C | 8/31/95 |
| BOAT TEL. NUMBER 23 | SAT. & SUN. ONLY | TABLE C (PERMITTED NOS.) | NONE | PIN NO. D | 2 SECURITY FAILURES |
| CELLULAR TEL. NUMBER 24 | ALL TIMES | NO EXCLUSIONS | NONE | NONE | NONE |
| VOICE MAIL TEL. NUMBER 25 | JULY 15 - JULY 28 ONLY | NO EXCLUSIONS | START AFTER 20 RINGS | NONE | NONE |

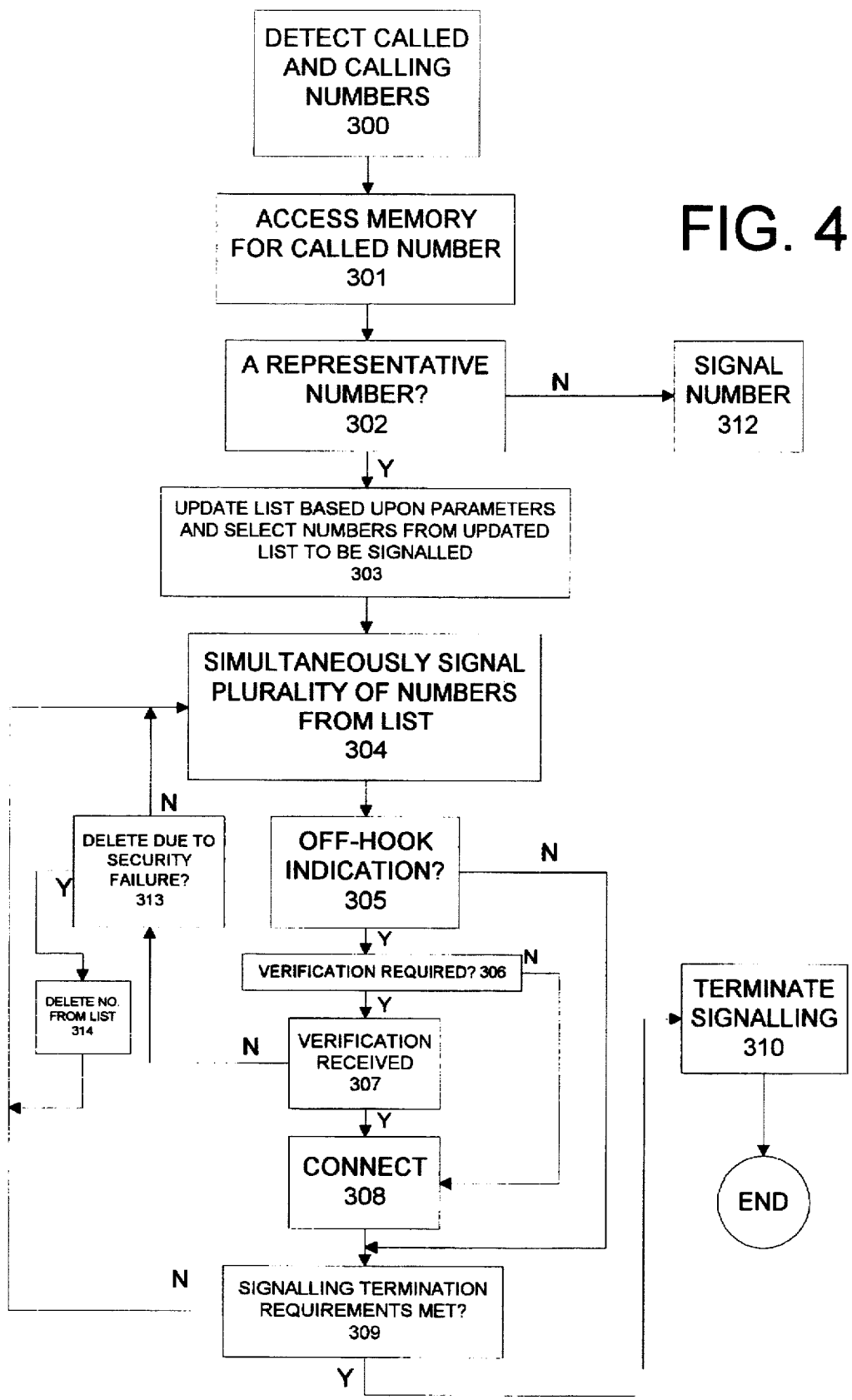

MULTI-RING TELEPHONE METHOD AND SYSTEM

BACKGROUND OF THE INVENTION

The present invention relates to a method and system for providing telephone service.

Telephones and telephone usage are proliferating in today's society. People have more than one telephone number in their home, a telephone number at the office, in their boat, in their car, cellular phones in their pocket, voice mail systems, answering systems and beepers, all to ensure that they can be reached.

If a caller desires to find someone at any one of a number of possible locations at which that person might be found, this poses a problem. The current telephone switch network does not provide any organized way of carrying out this goal. While it is possible to subscribe to a call forwarding service, it is a nuisance to constantly call in to change the forwarding number if one is moving from number to number. Moreover, if one forgets to change the forwarding number or to enable the call forwarding system, a call and perhaps an opportunity will be lost.

It is, of course, possible to provide a caller with all of the different telephone numbers at which the called party might be located, however, the caller must then serially call each of the numbers until reaching the desired party. Aside from being tiresome to the caller, the average caller would probably try only a few of the places before giving up. Additionally, if the called party has a telephone voice mail system or an answering machine installed at one of the numbers, after a caller leaves one message, it is unlikely that the caller will call the other numbers.

SUMMARY OF THE INVENTION

The main object of the present invention is to eliminate the disadvantages of the present telephone system.

Another object of the present invention is to provide a method and system for providing telephone service wherein a plurality of telephone numbers are simultaneously signalled to allow a calling party to find a called party at one of a plurality of numbers in an organized manner and in as short a time as possible.

A further object of the present invention is to provide a system and a method which automatically, adaptively and dynamically seeks out a called party at a plurality of different numbers.

Still another object of the present invention is a method and system for providing a conference call telephone service.

In accordance with one embodiment of the present invention, a list of telephone numbers is associated with a representative telephone number. A call to the representative telephone number from a calling telephone number is detected and a plurality of telephone numbers on the list are simultaneously signalled. Thereafter, the signalling at at least one of the plurality of telephone numbers is terminated.

The representative telephone number can be either a geographic or non-geographic number. Non-geographic numbers include N00-XXX-XXXX numbers (where N is, for example, 5, 7, 8 or 9) and the like, whereas geographic numbers would be those with conventional area codes such as 202-XXX-XXXX (which includes the Washington, D.C. area) and the like.

The list associated with the representative telephone number can be a list stored at the telephone company switch office of a party to be called and submitted by that party. Alternatively, a party to be a caller can submit a list of numbers to a telephone switching office for associating with a representative number. This would be particularly useful in setting up a conference call. Numbers can be added to the list at any time.

In another embodiment of the present invention, at least one of the numbers on the list can itself be a representative number with its own list of associated telephone numbers. In this way, a plurality of numbers from a first list and a plurality of numbers from at least one second list can be simultaneously signalled upon the detection of a call to the first mentioned representative telephone number. This would be particularly useful in setting up periodic conference calls where the called parties do not have fixed locations. In this case, the caller sets up a main representative number with its associated list of intended called parties numbers, some of which may be representative telephone numbers with their associated lists. The caller simply calls the main representative telephone number which signals at all of the telephone numbers which at the time have been designated by each of the called parties to be signalled.

The termination of the signalling at any of the plurality of telephone numbers that are being signalled can be effected by detecting an off-hook indication at a number, or by the off-hook indication together with verification that the party that is reached is the party being called. For example, the called party could enter a pin code on the telephone instrument to verify that the right party has been called. Alternatively, voice recognition could be used to verify that the person answering the phone is the proper party.

Telephone numbers also can be deleted from the list by a variety of means. For example, the person submitting the list to the telephone company could delete a number from the list at any time. Numbers could be placed on the list and automatically be removed after a period of time, for example, 24 hours, or 3 months. Additionally, if a called party at a called number on the list desires to have the number taken off, the called party can remove the telephone number from the list by entering a code. Telephone numbers also can be removed as a result of non-use, e.g., after a period of a certain number of months, or in response to a security failure, e.g., the answering party fails to enter the proper pin code after a number of tries, or if the number has been disconnected or changed.

Numbers on the list also can be made ineligible for being called based upon transitory characteristics or parameters. For example, one number on the list may be called only during daytime hours or during evening hours. Another number on the list, for example, may be called only during certain days of the week, e.g., either Monday through Friday or Saturday and Sunday only. Certain numbers could be called only during particular months out of the year, e.g., the summer months if the telephone number is for a vacation home.

The system also can be configured to terminate signalling at all of the plurality of telephone numbers in response to a valid off-hook indication at any one of the numbers. Alternatively, the termination could occur after two or more or all of the numbers had valid off-hook indications. This would be particularly useful in setting up a conference call.

In accordance with another aspect of the present invention, certain of the numbers on the list can be included or excluded from the numbers that are to be signalled depending upon characteristics of the calling number. Since the telephone switching office can identify the calling number with Automatic Number Identification (ANI) circuitry, it is possible to determine the identity of the calling number before the signalling is commenced. Thus, each telephone number on the list may have associated with it data in the form of a table which includes calling numbers for which the number on the list should or should not be signalled. Thus, if a party's list consists of five numbers, the party additionally may designate, for example, that his home number is to be signalled only for calls from a table of specified calling numbers and that his in-town apartment's number is not to be signalled for calls from another table of specified calling numbers.

In accordance with the present invention, when a caller dials a specific representative telephone number, the picking up of the telephone (with verification if required) at any of the simultaneously signalled numbers from the list establishes a connection among the caller and the other parties who have answered, but have not disconnected.

The list maker can change the list of numbers via a remote operation at any time, including adding or deleting permanent or temporary numbers to the list, and can add or change the expiration parameters of numbers. Alternatively, expiration parameters including ring/no answer or detect a never answered telephone number can be used to remove numbers from the list.

As can be seen from the above, an adaptive teleconferencing operation can be carried out by simultaneously signalling all of the telephone numbers to be teleconferenced and then establishing a conference call among all of those who answer.

The called party can establish a preference table which prevents specific parties from reaching the called party at certain places by using the automatic number identification system to determine the number of the calling party. The calling party's number is compared against a table in storage which can include or exclude certain calling numbers from access to signalling certain numbers on the list. This system also allows selecting callers who get special treatment either by ANI or by entry of a pin number or subscription number or the like.

The present invention allows instant subscription to a service of this type by calling a geographic number or a non-geographic number, such as an 800 number, from a single line telephone, setting configuration options and a list of telephone numbers. Thereafter, the switching system is configured to simultaneously signal all of the numbers on the list.

These and other objects and advantages of the present invention will be described in more detail with respect to the following description with reference to the attached drawings, wherein:

BRIEF DESCRIPTION OF THE DRAWINGS

FIG. 3 is a schematic diagram of the memory of FIG. 2;

FIGS. 4-5 are flow charts of method steps according to the present invention;

DETAILED DESCRIPTION OF THE INVENTION

Figure 1:
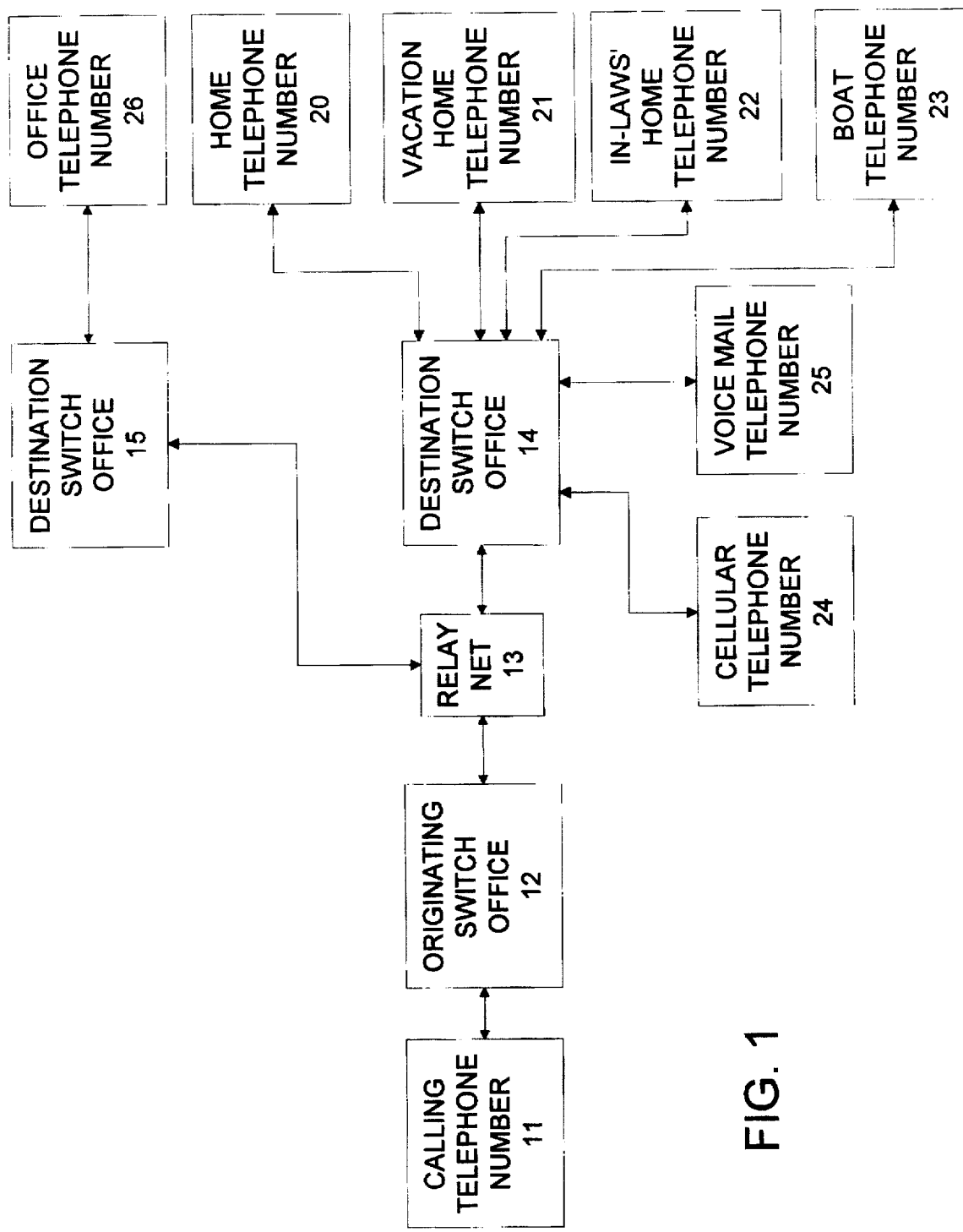
FIG. 1 is a block diagram of a telephone system according to the present invention.

Referring to FIG. 1, a calling party places a call with an instrument at a calling telephone number 11 to a representative telephone number, which, for the purposes of this description, is received at an originating switch office 12. The representative telephone number can be a geographic or non-geographic telephone number. The representative telephone number can be an instrument specific telephone number, or a virtual telephone number (i.e., one not associated with a specific telephone instrument). In the example, the representative telephone number is identified at the originating switch office 12 as one associated with destination switch offices 14, 15. In the general case, the representative telephone number can be identified as associated with one or more destination offices, one of which could be the originating office itself. In the exemplary embodiment, the representative number is 800-555-1111, and it contains two numbers on its list, 800-555-1234 serviced by destination switch office 14, and 202-555-6789 serviced by destination switch office 15. In the example, the calling party is trying to make a conference call at 10 AM, Tuesday, Sep. 19, 1995 to two parties, one of whom is on his customary extended summer/fall vacation. The call from calling telephone number 11 is routed through a subscriber line interface card in the originating switch office 12, which sends information including the caller identification through the relay net 13 to the destination switch offices 14 and 15. Thus, in accordance with one embodiment of the present invention, rather than signalling the representative number itself, a call to the representative number 800-555-1111 results in a plurality of numbers being signalled simultaneously, namely telephone number 26 (202-555-6789) and the representative number for numbers 20-25 (800-555-1234), both of which are on the list associated with 800-555-1111, which, in the exemplary embodiment, is stored at a tandem switching office within relay net 13.

Normally, the destination switch offices 14 and 15 would route the incoming call directly to a destination telephone number by physically connecting an incoming line to an appropriate outgoing line. However, according to the present invention, in the case of destination switch office 14, the called number is itself a representative number associated with a list of telephone numbers including home telephone number 20, vacation home telephone number 21, in-laws' home telephone number 22, boat telephone number 23, cellular telephone number 24, and voice mail telephone number 25. This list could have been prepared by the party involved, for example, before leaving on extended vacation in July.

Thus, rather than signalling only one number corresponding to the representative telephone number 800-555-1234, a plurality of the numbers 20-25 are signalled simultaneously in accordance with the present invention.

Figure 2:
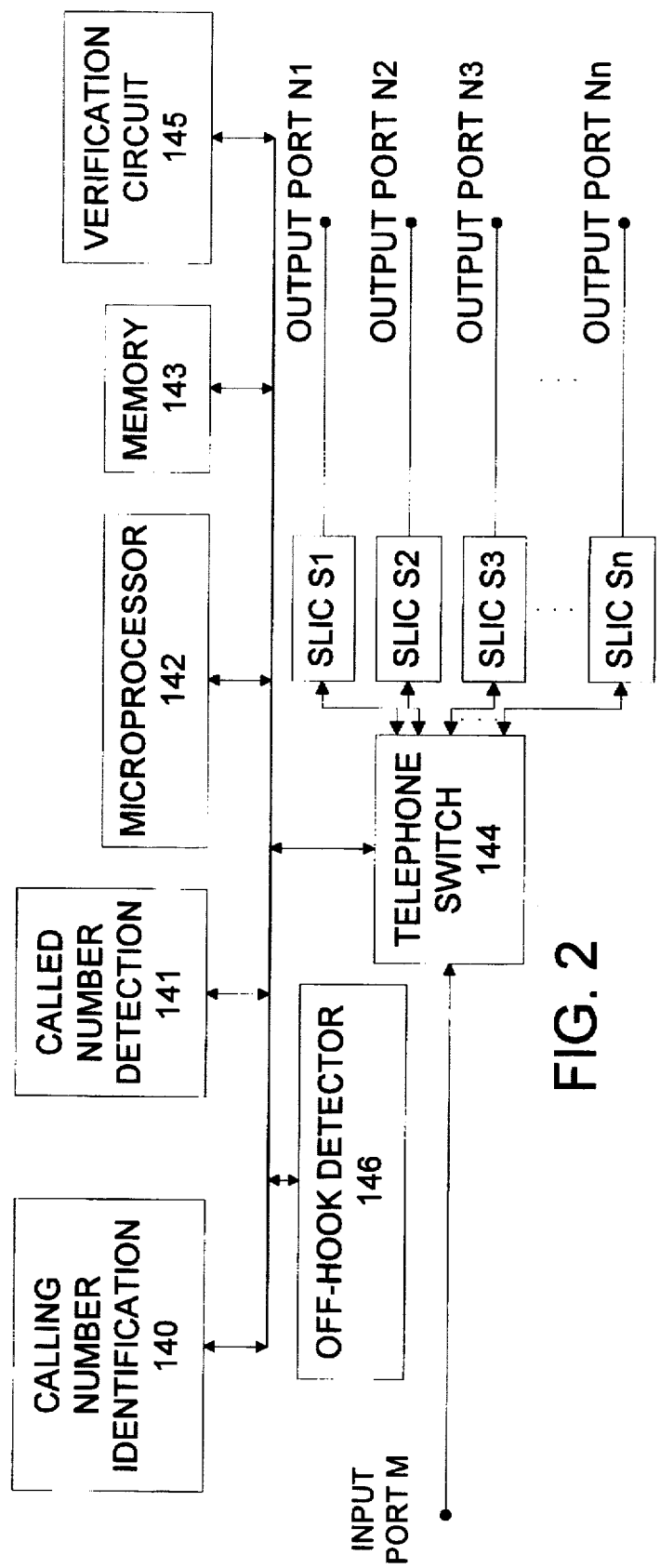
FIG. 2 is a schematic diagram of each switching office of FIG. 1.

FIG. 2 shows the circuitry for each switch office in more detail. As shown therein, the incoming call is received at input port M, which is the next available input port at the switching office and is applied to telephone switch 144. Telephone switch 144 is also connected to a calling number identification circuit 140, which is able to determine the ANI of the incoming call. A called number detection circuit 141 is also available for determining the identity of the number being called. In the case of switch office 12, the number being called is the representative telephone number 800-555-1111. In the case of switch office 14, the number being called is the representative number 800-555-1234. In the case of switch office 15, the number being called is 202-555-6789.

Also receiving information from the telephone switch 144 is the microprocessor 142 with its associated memory 143. The microprocessor receives the called telephone number from the called number detection circuit 141 and looks in memory 143 to see if there is a list of numbers associated therewith. In the case of the originating switch office 12, the list would include two numbers which will connect via relay net 13 to destination switch offices 14 and 15. In the case of destination switch office 15, there is no list associated with the number and only office telephone number 26 is signalled. In the case of destination switch office 14, as shown in FIG. 3, there are six telephone numbers on a list associated with the representative telephone number. The microprocessor then configures the telephone switch to simultaneously signal at a plurality of the numbers on the list via output ports N1—N1, N2, N3, ... Nn via subscriber line interface cards S1, S2, S3, ... Sn. All of the switch offices 12, 14 and 15, as well as those within relay net 13, could have similar circuitry for signalling a plurality of telephone numbers. In the case of originating switch office 12, the output ports would be used for signalling the telephone number 800-555-1111 at a tandem switching office within relay net 13. In the case of that tandem switching office, the output ports would be used for signalling the telephone numbers 800-555-1234 and 202-555-6789. In the case of destination switch office 14, the output ports would be used for signalling the telephone numbers 20-25. In the case of destination switch office 15, the output ports would be used for signalling the telephone number 202-555-6789.

Memory 143 also has other stored information relating to the list of associated telephone numbers. In the example, the information for the representative telephone number 800-555-1234, which is stored at destination switch office 14, is set forth in the first column of FIG. 3, and includes the signalling termination requirements and the signalling parameters for each number on the list. For example, as shown in FIG. 3, the home telephone number would only be signalled only from 6:00 p.m. through 12:00 a.m. seven days a week, the vacation home number would be signalled only from 9:00 a.m. to 5:00 p.m. Monday through Friday, the in-laws' home telephone number would be signalled only from 6:00 p.m. through 10:00 p.m. during the summer month of August, the boat telephone number would be signalled only on Saturday and Sunday, the cellular telephone would be signalled at all times and the voice mail telephone number would be signalled only during a particular fourteen day period.

Thus, if 800-555-1234, the representative telephone number on the list of 800-555-1111, is called on Tuesday, Sep. 19, 1995 at 10:00 AM, there will be simultaneous ringing at the vacation home telephone number 21 and the cellular telephone number 24. If, on the other hand, the call is made Saturday, Aug. 19, 1995 at 9:00 p.m., signalling will occur at the home telephone number 20, the in-laws' home telephone number 22, the boat telephone number 23, and the cellular telephone number 24.

The microprocessor also makes use of the ANI from the calling number identification circuit 140. The memory 143 stores ANI signalling parameters associated with each number in the list. Telephone number 22 has a table B of telephone numbers which would be excluded from signalling it. Thus, if the ANI identification of the calling number matches a number on table B, the in-laws' home telephone number would not be signalled, even if the time parameters would allow it to be signalled.

Similarly, telephone number 23 has a table C of permitted callers associated with it. The microprocessor compares the ANI of the calling number with table C of permitted callers, and, unless there is a match, the boat telephone number would not be signalled, even if the time parameters would allow it to be signalled.

The cellular telephone number 24 has no exclusions and thus it can be reached by any calling party.

It also should be noted that the in-laws' home telephone number and the voice mail telephone number have delay parameters associated with them. Thus, after a predetermined time period of signalling, the microprocessor will thereafter signal additionally the in-laws' home telephone number 22 and the voice mail telephone number 25, provided, of course, that the other signalling parameters are satisfied.

The switching office circuitry also includes a verification circuit 145. The verification circuit is used in order to verify that the party that is reached is the party being called. Memory 143 contains verification parameters to verify that the person answering the telephone is the proper party. Verification circuit 145 compares the code or data in memory 143 with the code or data received from the answering party to perform verification.

The verification code can be a Personal Identification Number (PIN) code which the answering party must key in in order to obtain verification, it can be voice data which would then be compared to a pre-recorded sample of the voice of the answering party for a match and thus verification, or it could be the name of a person which the verification circuit would compare to a name keyed-in or said by an answering party.

The switching station further comprises an off-hook detector 146 which detects an off-hook signalling indication from one or more of the numbers being signalled.

Although a plurality of telephone numbers are signalled simultaneously, the manner in which the signalling is terminated is dependent upon the type of telephone service desired.

In the instance where the information set forth in memory 143 is entered by a party to ensure that that party be reached by a caller when the called party is at one of various locations, memory 143 will preferably have an instruction from the party making the list that the signalling terminate at all of the plurality of telephone numbers, upon the off-hook indication, with or without verification, as determined by the verification parameters, at any one of the plurality of telephone numbers. This is indicated in the termination parameter of the representative number, shown in FIG. 3 as "1 OFF-HOOK".

Alternatively, the called party may desire that more than one person be involved in a telephone conversation with a calling party, for example, for a particular calling party such as a child away at school. In this case, the called party may desire that the caller talk to both the child's father and mother on the same call. In that instance, the memory 143 would have instructions to terminate signalling after an off-hook indication at two of the plurality of telephone numbers, again, with or without verification, as determined by the verification parameters. This would appear as "2 OFF-HOOK".

In another embodiment of the present invention, the list is supplied by a party desiring to set up a conference call, for example, a conference call among various business associates. In that instance, the representative telephone number has a plurality of different numbers on the list and, upon the calling of the representative number, a plurality of the numbers on the list are simultaneously signalled. Because the caller desires to speak to all of the persons on the list, signalling will not terminate until there is an off-hook indication at all of the plurality of telephone numbers. Because there is a possibility that one of the persons will not be available, the signalling could terminate after a suitable number of rings.

Alternatively, one or more of the called numbers on the list may itself be a representative telephone number with an associated list of telephone numbers which would be called simultaneously and for which signalling among those numbers would terminate after an off-hook indication at one of the plurality of those telephone numbers. Signalling among the numbers on the first list, however, would not terminate until the requirements applicable to the first list are met.

Other alternative embodiments are possible in accordance with the present invention. Thus, for example, the signalling can be terminated when there is an off-hook indication at a majority of the plurality of telephone numbers, for example, three out of five. This might be useful for a telephonic Board of Directors meeting.

In a particularly advantageous embodiment of the present invention, a number of default templates can be available to a party storing a list at a switch office. For example, if a party anticipating being called, or a party attempting to reach a single party, provides the list, a "one-party default" template could include 1 OFF-HOOK or 10 rings for terminating signalling, no verification, all numbers signal simultaneously with no delay, and all numbers are permanent. Similarly, if a party planning a conference call provides the list, a "multiple-party default" template could include all OFF-HOOK or 15 rings, no verification, all numbers signal simultaneously with no delay, and all numbers are permanent. By the use of default templates, the time for setting up a list is greatly reduced.

Figure 2A:
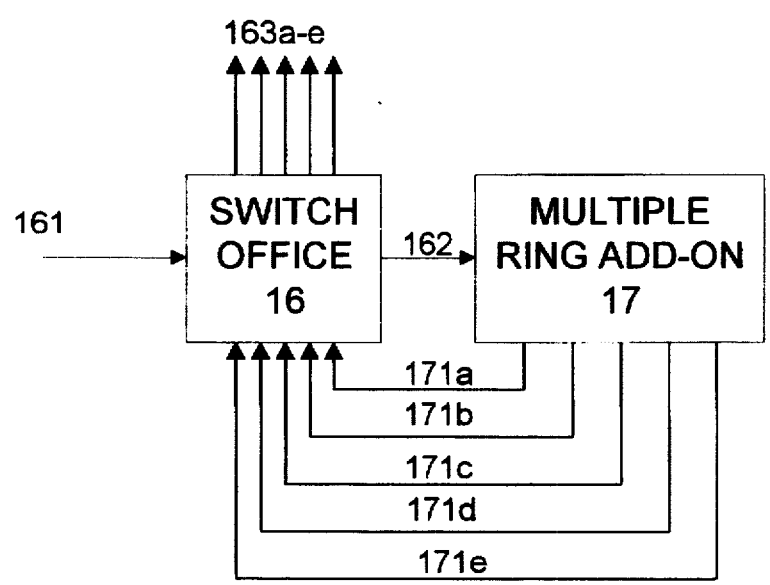
FIG. 2A is a schematic diagram of an alternative embodiment of FIG. 2.

An alternative embodiment of the present invention is shown in FIG. 2A.

In this embodiment, fan out hardware in accordance with the present invention can be an add-on 17 to an existing switch 16. After switch 16 receives an incoming call at 161, add-on hardware 17 takes an outgoing signal 162 from switch 16 and, if the signal is to a representative number, breaks it into multiple signals 171a–e and feeds those signals back into the switch 16 as incoming signals which will be redirected as outgoing signals 163a–e. Some of the outgoing signals could be again multiplied and sent back to the switch 16.

The add-on hardware 17 includes those elements 140–146 which are not found in conventional switch offices.

A more detailed description of the method of using the apparatus shown in FIGS. 1–3 is now described in more detail with reference to the following flow charts.

Figure 5:
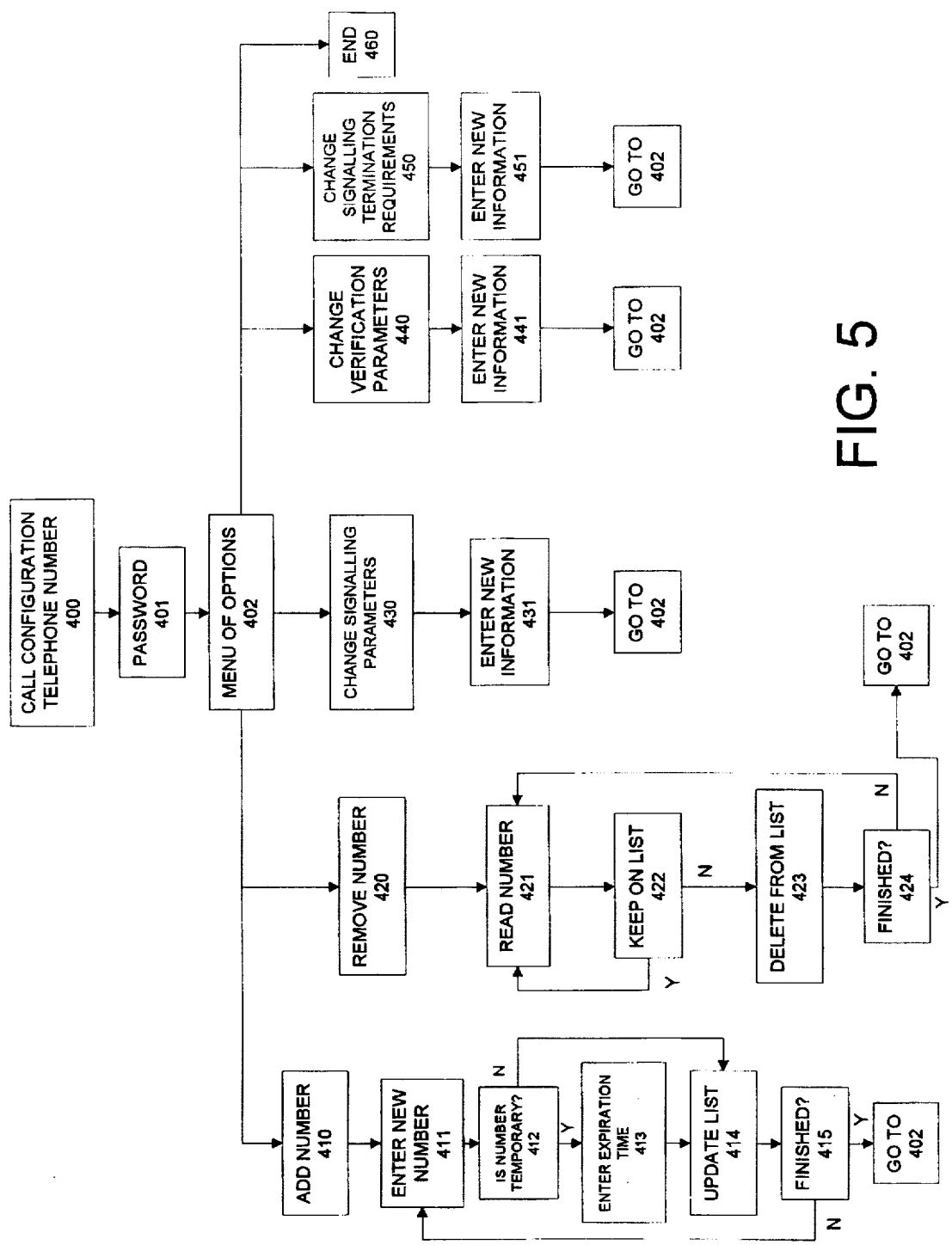

The method of the present invention is described with reference to FIGS. 4 and 5 which, for the sake of clarity, illustrate the steps carried out in switch office 14. However, the method steps are equally applicable to all of the switching offices.

Referring now to FIG. 4, as applied to destination office 14, in step 300, the calling number identification circuit 140 and called number detection circuit 141 determine from the information received over the telephone network the identification of the telephone number from which a call is being made and the number to which a call is to be placed.

The identified numbers from circuits 140 and 141 are received by microprocessor 142 which accesses memory 143 in step 301 to see if there is a list of telephone numbers associated with the called number in step 302. In the example, the called number, 800-555-1234 is a representative number that has an associated list including telephone numbers 20–25. If it were not a representative number, then the number would be signalled in step 312.

In step 303, microprocessor 142 applies the parameters to update the list and to determine which numbers from the updated list should be signalled. In step 303, when the current time and date are compared to the deletion parameters, microprocessor 142, upon finding a number which has expired, can remove the number from the list automatically during that step. In the example, assuming the call were made prior to Aug. 31, 1995, the deletion parameters would not require any updating of the list. The time parameters and the ANI parameters would then be reviewed, and based upon the information in memory 143, the microprocessor 142 would determine which numbers on the updated list are to be simultaneously signalled. Assuming for the purposes of this example that numbers 20, 22 and 24 meet all of the signalling criteria, and further assuming that the signalling is not terminated because the signalling termination requirements are met, in step 304 numbers 20 and 24 would be simultaneously signalled for five rings, after which 20 would cease to be signalled but 24 would continue to be signalled for one ring, after which 22 would commence, and 24 would continue, to be signalled, all in accordance with the signalling delay parameters shown in FIG. 3.

In step 305, off-hook detector 146 looks for an off-hook indication at any one of the signalled numbers. Upon receiving an off-hook indication from home telephone number 20 for example, the microprocessor looks to the verification parameters in memory 143 to see if verification is required in step 306. If not, the call is connected in step 308. If it is required, verification circuit 145 then seeks verification in step 307 by means of, e.g., the input of a PIN code on the key pad of the answering instrument. If the PIN code is incorrect, the system will not make a connection, but will continue to simultaneously signal the remaining numbers of the plurality. If the verification is correct, there will be a connection to the number in step 308.

If verification is not received, the system determines in step 313, in accordance with the deletion parameters, if the number should be deleted from the list. If it should be deleted, it is deleted in step 314. Whether or not the number is deleted, signalling continues in step 304.

Depending upon the signalling termination requirements, i.e., the number of connections that must be made before signalling termination (which can range from 1 to all of the plurality of simultaneously signalled numbers), the number of signals (or rings) that must be made before signalling termination, and the amount of time that must elapse, the signalling may or may not be terminated at this time in step 309. For example, if only a single connection is required to terminate, then the signalling will be terminated in step 310 and the method ends. If on the other hand, two or more connections must be made before termination, the method returns to step 304 with the remaining numbers signalled until another off-hook indication is received, or the system times out in step 309.

The system also has the capability for either the calling party or a called party (who has answered) to manually terminate signalling at all of the other numbers being signalled by entering a predetermined tone code, such as "***". This code is recognized by detection circuit 141 which applies a control signal to microprocessor 142 which terminates signalling at the other numbers.

It is also contemplated that the representative number can be one that is a particular end user telephone with the result that that particular telephone number will be signalled simultaneously as one of the plurality of numbers. Alternatively, the number can be a virtual telephone number, that is, one which is not associated with any telephone instrument, as is the case in the example.

The manner in which the information stored in memory 143 is entered and later updated is disclosed with regard to FIG. 5. The calling number identification circuit 140 detects a call configuration telephone number in step 400 and the verification circuit 145 receives a password keyed in by the caller in step 401. The microprocessor, upon receiving a favorable comparison indication from the verification circuit 145, presents a verbal menu of various options which are available in step 402. For example, a configuration message would play to the user a message such as press the pound key "#" to add a new number to the list, press the star key "*" to remove a number from the list, press "S" to change signalling parameters for a number on the list, press "V" to change verification parameters for a number on the list, press "X" to change signalling termination parameters for the list and press "E" to end. Depending upon the tone received from the caller, the microprocessor selects one of the six menus in steps 410, 420, 430, 440 450 and 460.

If a new number is to be added to the list, the caller is prompted to enter the new number in step 411 and the list is updated in step 414. When the caller is finished in step 415, the caller returns to the menu step 402. Deletion information can also be included so that a number can appear on the list, but be valid only until a particular time, for example, Aug. 31, 1995. This is entered in steps 412 and 413.

If the caller chooses to remove a number in step 420, the microprocessor will read through every stored number on the list in step 421 and the caller will be prompted to hit the pound key to keep the number or the star key to delete the number in steps 422 and 423. If the number is to be kept, then the next number is read out in sequence. If that number is to be not kept, it is deleted in step 423. When the caller is finished in step 424, the caller returns to the menu step 402.

If the caller selects the change signalling parameters menu in step 430, the user will be prompted in step 431 to enter time and date information relating to a number. ANI and delay parameters can also be changed. After the user is finished, the user is returned to menu step 402.

When the caller selects the change verification parameters menu step 440, the user will be prompted in step 441 to enter a code for each number on the list and to indicate whether it is a PIN code, a name code or a voice code. The menu returns the user to 402.

When the caller selects change signalling termination requirements at step 450, the caller is prompted to enter the signalling termination requirements at step 451, i.e., the number of off-hooks, the amount of time and the number of rings which will terminate signalling. The user is then returned to the main menu 402.

The user can exit at any time by selecting the end option in step 460.

In a particularly preferred embodiment of the present invention, the calling party enters a list of numbers corresponding to persons with whom a conference call will be set up. At this time, the caller will also indicate as part of the stored information relating to the representative telephone number, the number of off-hook indications that will be required before the signalling is terminated. In the case of a conference call, it is desired that all of the plurality of numbers have an off-hook indication if possible. Thus when the caller dials the representative number, the microprocessor 142 effects the simultaneous signalling of each of the plurality of numbers on the list so that they are signalled simultaneously and does not terminate signalling until each has an off-hook indication (or a security failure) or there is a time out termination. As was noted previously, each of the numbers that the caller is calling for the conference call also can be a representative number itself which simultaneously signals an associated list of numbers determined by the called party.

Numbers can also be removed from the list by other than the person initially setting up the list. For example, as was described above, the microprocessor 142 can remove a number from the list if its termination parameter indicates that the number has expired. Alternatively, the microprocessor can keep a record stored in memory for each number of how long a period has elapsed since an off-hook indication was received at a particular number. After a suitable waiting time, for example, six months or a year, the number can be automatically removed from the list by the microprocessor.

In another situation, a person answering a call can be prompted during the verification process to request that the number be removed from the list. The answering party can then enter the proper keying information which will be understood by the microprocessor to indicate that a number should be removed from the list.

As used herein, the term "signalling" refers to an indication of a call being sent, for example, ringing a telephone. Between switching offices, signalling is carried out without ringing.

Although various embodiments have been described in detail above, those having ordinary skill in the art will understand that modifications are possible in the preferred embodiments without departing from the teachings thereof.

While various configuration options have been described herein, it should be understood that many other configuration options can also be incorporated.

One option is what a calling party will hear while the calls are being placed. At the option of the provider, this may be a repeating message that the calls are being placed, a synthetic ring tone or all of the actual ring tones at the same time.

As people answer a call, a temporary conference call is obtained among those answering parties who stay on the line. Because there is a possibility that two or more parties may want to speak during the time they are waiting for others to answer, the volume of whatever is heard (after the first party answers) will be automatically lowered.

While the system described herein has a local office simultaneously signalling to two destination offices via the relay net, it should be understood that this system is not limited to such an operation and that the local office could also signal numbers that it serviced directly.

With respect to the possible modifications, the relay net 13 shown in FIG. 1 will now be discussed in more detail.

In current telephone systems, there are two classes of switches: tandems and end offices. Tandems connect to other switches, i.e., other tandems and end offices, and end offices connect to tandems and end users (subscribers). In a given call, there is an originating end office and a terminating or destination end office, although one physical end office may be both the originating and terminating office for a particular call. In the present configuration of the telephone system in the United States, virtual telephone numbers are stored at a tandem, while actual telephone numbers are stored at an end office.

Figure 6:
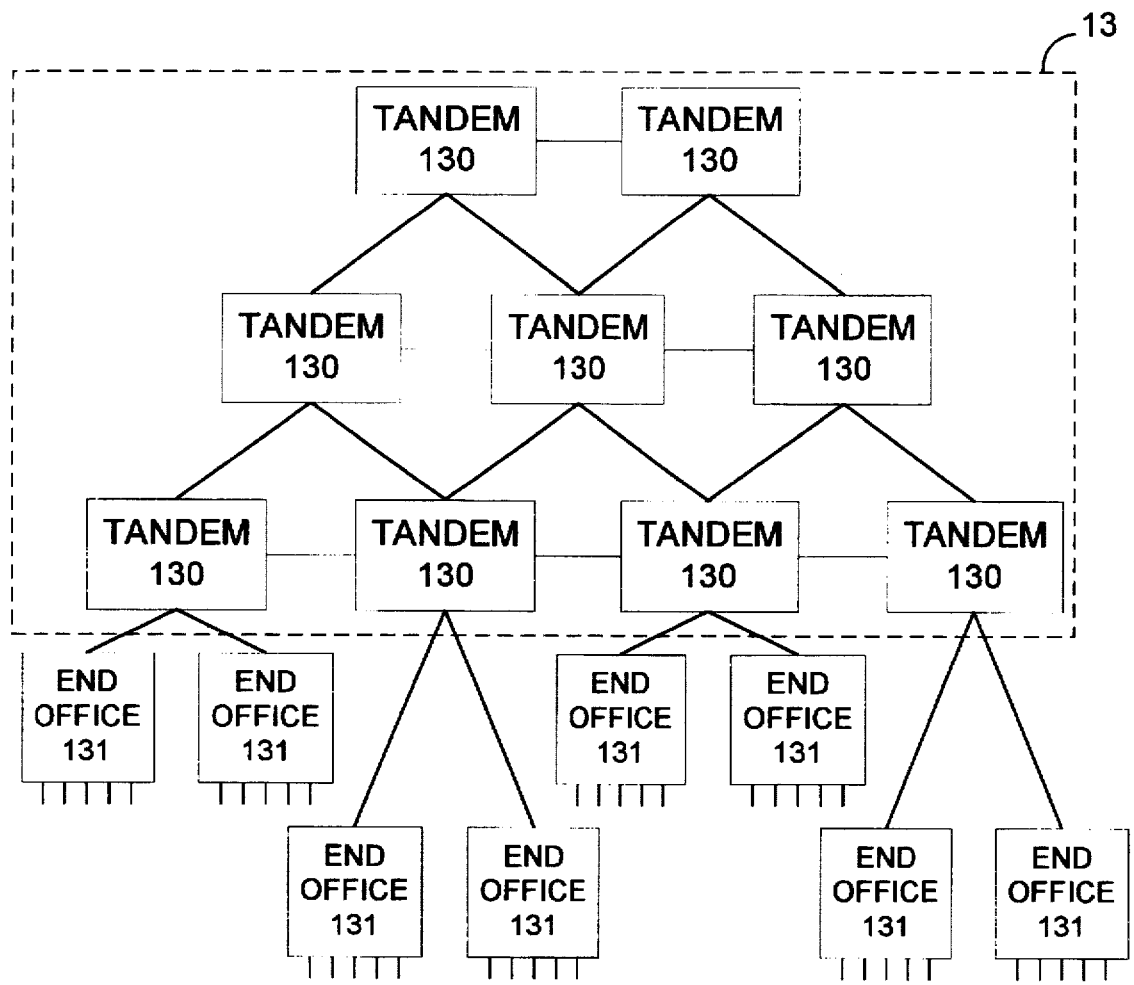
FIG. 6 is a schematic of the relay net of FIG. 1.

Referring to FIG. 6, the relay net 13 comprises a plurality of tandems 130 connected to one another. Each tandem is connected to one or more end offices 131, which are connected to subscribers.

In FIG. 1, relay net 13 is shown connecting switch offices 12, 14 and 15. In that embodiment, the switch offices shown are all end offices, and fan outs occur within relay net 13 and at end office 14. However, other configurations are possible in accordance with the present invention.

FIGS. 7A–7D illustrate other configurations for switches in accordance with the present invention. The examples shown therein are not intended to be all inclusive, rather they are shown by way of example.

FIGS. 7A–7D show that the fanning out from a single line to many lines can occur at any switch, i.e., at one or more tandems, at one or more end offices or at one or more of both tandems and end offices.

Figure 7A:
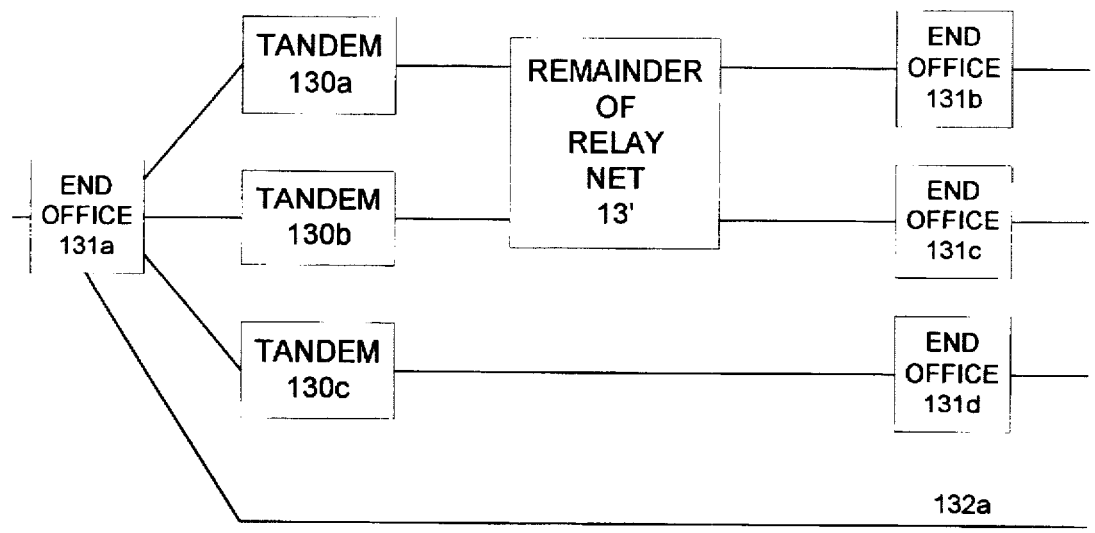
FIG. 7A-7D are schematic diagrams of alternative embodiments of telephone systems according to the present invention.

FIG. 7A illustrates one configuration where the fan out is at an originating end office. In that configuration, the end office 131a is the originating end office and it fans out to three tandems 130a–130c and directly to a subscriber line 132a (so that in this case, it is also a destination end office). Tandems 130a and 130b use the remainder of the relay net 13' to reach subscribers at destination end offices 131b and 131c. Tandem 130c communicates directly with destination end office 131d to reach a subscriber.

Figure 7B:
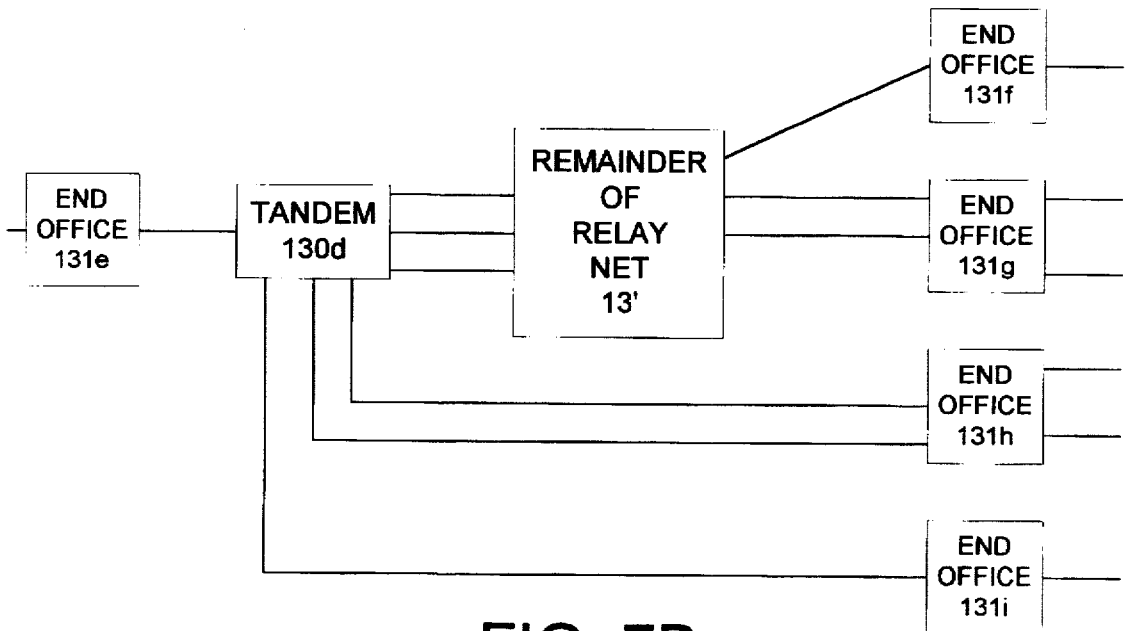

In the embodiment of FIG. 7B, all of the fanning out is done at a tandem 130d which is connected to the calling party via originating end office 131e. Tandem 130d fans out two lines directly to destination end office 131h to reach two subscribers and one line directly to destination end office 131i to reach one subscriber. Tandem 130d also fans out three lines to the remainder of the relay net 13' which connects one line to destination end office 131f and two lines to destination end office 131g to signal two subscribers.

Figure 7C:
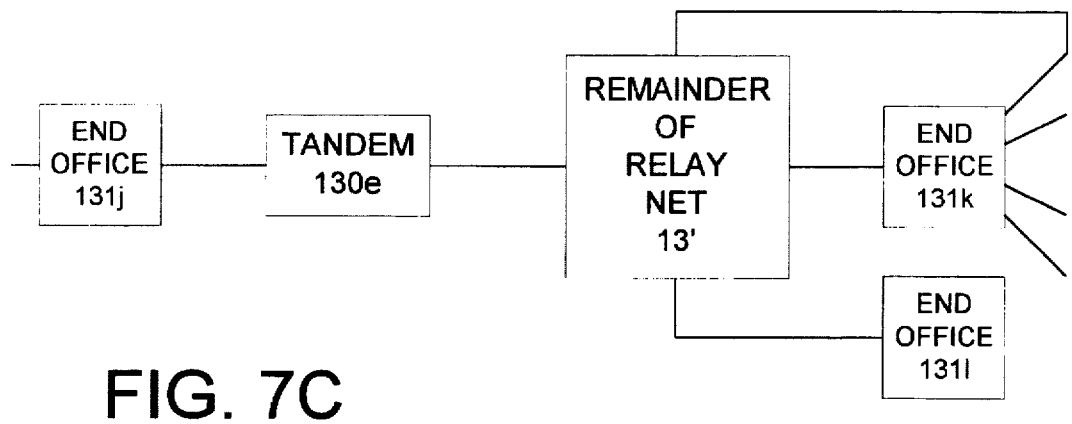

In FIG. 7C, the fanning out occurs at the destination end office 131k. In this embodiment, the calling party is at an originating end office 131j which communicates via tandem 130e to the remainder of the relay net 13' which then connects to destination end office 131k, wherein the call is fanned out to four lines, one of which is served by end office 131l.

Figure 7D:
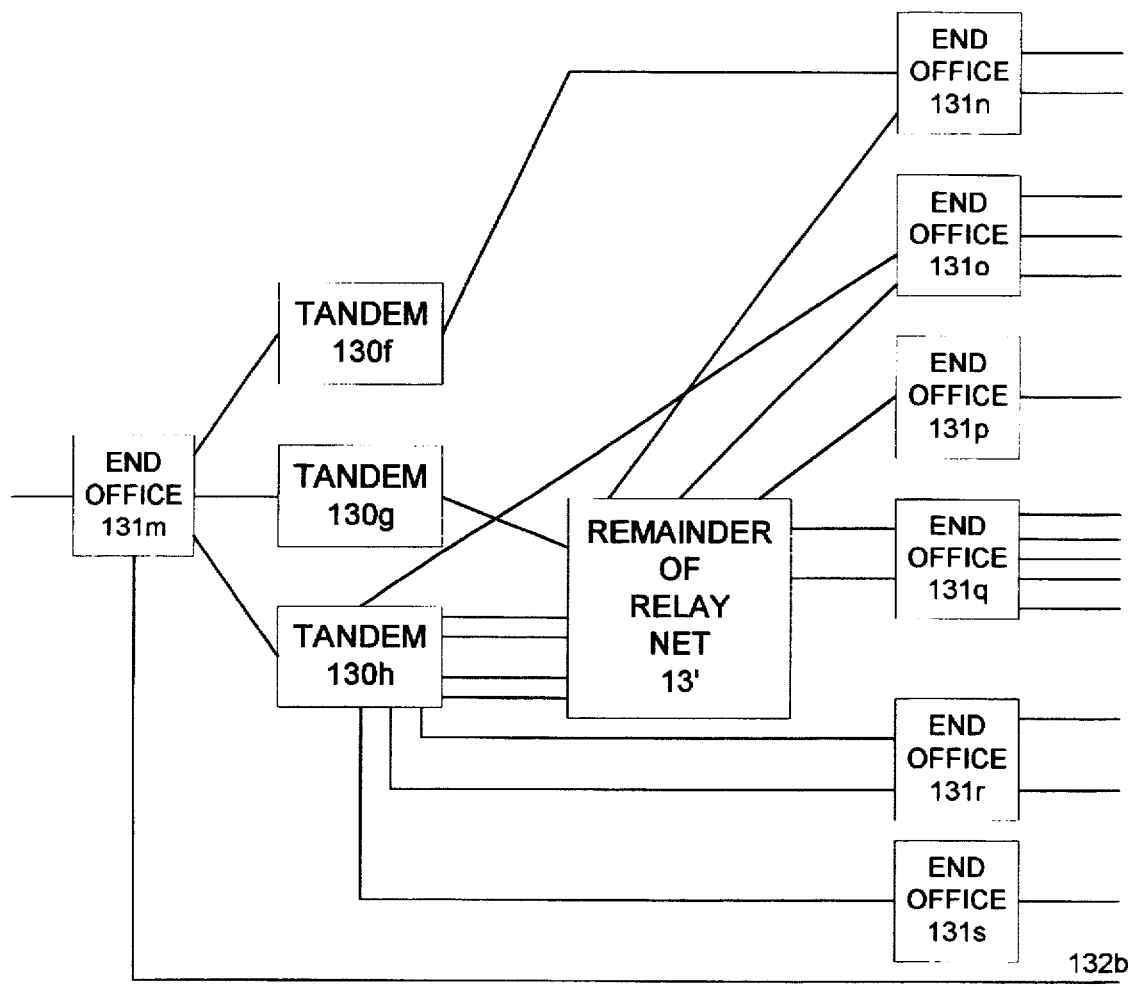

FIG. 7D illustrates a combination of the configurations of FIGS. 7A–7C, wherein fanning out occurs at the originating end office 131m, the tandem 130h and destination end offices 131o and 131q. As shown, the end office 131m fans out to three tandems 130f–h and directly to a subscriber line 132b. Tandem 130f connects to end office 131n which also receives one connection from the remainder of the relay net 13'. Tandem 130g connects to the remainder of the relay net 13' and tandem 130h takes in the single line and fans it out to eight numbers including a direct connection to end office 131o, four connections to the remainder of the relay net 13', two lines to end office 131r and one line to end office 131s. The remainder of the relay net 13' connects to end offices 131n, 131o, 131p and 131q. End office 131o fans out one incoming line to two lines, and end office 131q fans out one incoming line to four lines.

It should be recognized that the fan outs can cause routings at a switch office that start out for different end offices to end up at the same end office, and vice versa, as is shown in FIG. 7C.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method for providing telephone service comprising the steps of:

associating a list of telephone numbers with a representative telephone number;

detecting a call to the representative telephone number from a calling telephone number;

simultaneously signalling at a plurality of telephone numbers on the list; and thereafter terminating the signalling at remaining ones of the plurality of telephone numbers in response to an off-hook indication at more than one of the plurality of telephone numbers.

2. The method according to claim 1, wherein the step of associating comprises storing the list of telephone numbers.

3. The method according to claim 1, wherein the step of associating comprises storing the list of telephone numbers and thereafter adding at least one telephone number to the stored list.

4. The method according to claim 1, wherein the step of associating comprises storing the list of telephone numbers and thereafter deleting at least one stored telephone number from the list.

5. The method according to claim 4, wherein the step of deleting comprises deleting one stored telephone number at a predetermined time.

6. The method according to claim 4, wherein the step of deleting comprises deleting one stored telephone number after a predetermined period of non-use.

7. The method according to claim 4, wherein the step of deleting comprises deleting one stored telephone number in response to a security failure at said one telephone number.

8. The method according to claim 4, wherein the step of deleting comprises deleting one stored telephone number in response to a request by a called party at said one telephone number.

9. The method according to claim 1, wherein the list of telephone numbers includes a telephone number which is a representative telephone number.

10. The method according to claim 1, wherein the representative telephone number is one of a geographic and non-geographic telephone number.

11. The method according to claim 1, wherein the representative telephone number is one of a virtual telephone number and a telephone instrument specific telephone number.

12. A method for providing telephone service comprising the steps of:

associating a list of telephone numbers with a representative telephone number by storing the list of telephone numbers including at least one telephone number valid for a preselected time period;

detecting a call to the representative telephone number from a calling telephone number;

simultaneously signalling at a plurality of valid telephone numbers on the list; and thereafter terminating the signalling at at least one of the plurality of telephone numbers.

13. A method for providing telephone service comprising the steps of:

associating a list of telephone numbers with a representative telephone number by storing the list of telephone numbers and a table of telephone numbers for which calls from at least one telephone number in said table to at least one telephone number on the list are blocked;

detecting a call to the representative telephone number from a calling telephone number;

simultaneously signalling at a plurality of non-blocked telephone numbers on the list; and thereafter terminating the signalling at at least one of the plurality of telephone numbers.

14. A method for providing telephone service comprising the steps of:

associating a list of telephone numbers with a representative telephone number by storing the list of telephone numbers including at least one telephone number valid only after a preselected elapsed time period of signalling;

detecting a call to the representative telephone number from a calling telephone number;

simultaneously signalling at a plurality of valid telephone numbers on the list; and thereafter terminating the signalling at at least one of the plurality of telephone numbers.

15. The method according to claim 12, 13 or 14, wherein the step of terminating comprises terminating the signalling at all of the plurality of telephone numbers in response to an off-hook indication at one of the plurality of telephone numbers.

16. The method according to claim 12, 13 or 14, wherein the step of terminating comprises terminating the signalling at one of the plurality of telephone numbers in response to an off-hook indication thereat and continuing signalling at remaining ones of the plurality of telephone numbers for which an off-hook indication has not been received.

17. The method according to claim 12, 13 or 14, wherein the step of terminating comprises terminating the signalling at one of the plurality of telephone numbers in response to no off-hook indication thereat within a predetermined time period.

18. The method according to claim 12, 13 or 14, wherein the step of terminating comprises terminating the signalling at all of the plurality of telephone numbers in response to an off-hook indication at one of the plurality of telephone numbers and receiving verification from an answering party.

19. The method according to claim 18, wherein the step of receiving verification comprises receiving a personal identification number code.

20. The method according to claim 18, wherein the step of receiving verification comprises receiving response tones.

21. The method according to claim 18, wherein the step of receiving verification comprises receiving predetermined verbal responses.

22. The method according to claim 18, wherein the step of receiving verification comprises voice recognition analysis of an answering party.

23. A system for providing telephone service comprising:

a memory for storing a list of telephone numbers associated with a representative telephone number;

a detection circuit for detecting a call to the representative telephone number from a calling telephone number;

a circuit for simultaneously signalling at a plurality of telephone numbers on the list; and a processor for thereafter terminating the signalling at remaining ones of the plurality of telephone numbers in response to an off-hook indication at more than one of the plurality of telephone numbers.

24. The system according to claim 23, wherein the processor thereafter adds at least one telephone number to the stored list.

25. The system according to claim 23, wherein the list of telephone numbers includes a telephone number which is a representative telephone number.

26. The system according to claim 23, wherein the representative telephone number is one of a geographic and non-geographic telephone number.

27. The system according to claim 23, wherein the representative telephone number is one of a virtual telephone number and a telephone instrument specific telephone number.

28. The system according to claim 23, wherein the memory. detection circuit, circuit for signalling and processor are disposed in at least one tandem switch.

29. The system according to claim 23, wherein the memory, detection circuit, circuit for signalling and processor are disposed in at least one end office switch.

30. The system according to claim 23, wherein the memory, detection circuit, circuit for signalling and processor are disposed in at least one tandem switch and at least one end office switch.

31. The system according to claim 23, wherein the memory, detection circuit, circuit for signalling and processor are at least partly add-on circuitry to a telephone switch.

32. The system according to claim 23, wherein the processor thereafter deletes at least one stored telephone number from the list.

33. The system according to claim 32, wherein the processor deletes one stored telephone number at a predetermined time.

34. The system according to claim 32, wherein the processor deletes one stored telephone number after a predetermined period of non-use.

35. The system according to claim 32, wherein the processor deletes one stored telephone number in response to a security failure at said one telephone number.

36. The system according to claim 32, wherein the processor deletes one stored telephone number in response to a request by a called party at said one telephone number.

37. A system for providing telephone service comprising:

a memory for storing a list of telephone numbers associated with a representative telephone number including data for at least one telephone number indicating a preselected time period during which said at least one telephone number is valid;

a detection circuit for detecting a call to the representative telephone number from a calling telephone number;

a circuit for simultaneously signalling at a plurality of valid telephone numbers on the list; and a processor for thereafter terminating the signalling at at least one of the plurality of telephone numbers.

38. A system for providing telephone service comprising:

a memory for storing a list of telephone numbers associated with a representative telephone number including a table of telephone numbers for which calls from at least one telephone number in said table to at least one telephone number on the list are blocked;

a detection circuit for detecting a call to the representative telephone number from a calling telephone number;

a circuit for simultaneously signalling at a plurality of non-blocked telephone numbers on the list; and a processor for thereafter terminating the signalling at at least one of the plurality of telephone numbers.

39. A system for providing telephone service comprising:
a memory for storing a list of telephone numbers associated with a representative telephone number including data for at least one telephone number indicating a preselected elapsed time period of signalling only after which the at least one telephone number is valid;
a detection circuit for detecting a call to the representative telephone number from a calling telephone number;
a circuit for simultaneously signalling at a plurality of valid telephone numbers on the list; and
a processor for thereafter terminating the signalling at at least one of the plurality of telephone numbers.

40. The system according to claim 37, 38 or 39, wherein the processor terminates the signalling at all of the plurality of telephone numbers in response to an off-hook indication at one of the plurality of telephone numbers.

41. The system according to claim 37, 38 or 39, wherein the processor terminates the signalling at one of the plurality of telephone numbers in response to an off-hook indication thereat and continues the signalling at remaining ones of the plurality of telephone numbers for which an off-hook indication has not been received.

42. The system according to claim 37, 38 or 39, wherein the processor terminates the signalling at one of the plurality of telephone numbers in response to no off-hook indication thereat within a predetermined time period.

43. The system according to claim 37, 38 or 39, wherein the processor terminates the signalling at all of the plurality of telephone numbers in response to an off-hook indication at one of the plurality of telephone numbers and receiving verification from an answering party.

44. The system according to claim 43, wherein the verification comprises a personal identification number code.

45. The system according to claim 43, wherein the verification comprises received tones.

46. The system according to claim 43, wherein the verification comprises predetermined verbal responses.

47. The system according to claim 43, further comprising a voice recognition analyzer for verifying the voice of an answering party.

* * * * *